Sept. 11, 1923.

H. E. ANDERSON 1,467,701

BRAKE APPARATUS FOR RAILWAY AND OTHER VEHICLES

Filed March 12, 1921  6 Sheets-Sheet 1

Sept. 11, 1923.  1,467,701
H. E. ANDERSON
BRAKE APPARATUS FOR RAILWAY AND OTHER VEHICLES
Filed March 12, 1921    6 Sheets-Sheet 2

Sept. 11, 1923.  1,467,701
H. E. ANDERSON
BRAKE APPARATUS FOR RAILWAY AND OTHER VEHICLES
Filed March 12, 1921    6 Sheets-Sheet 3

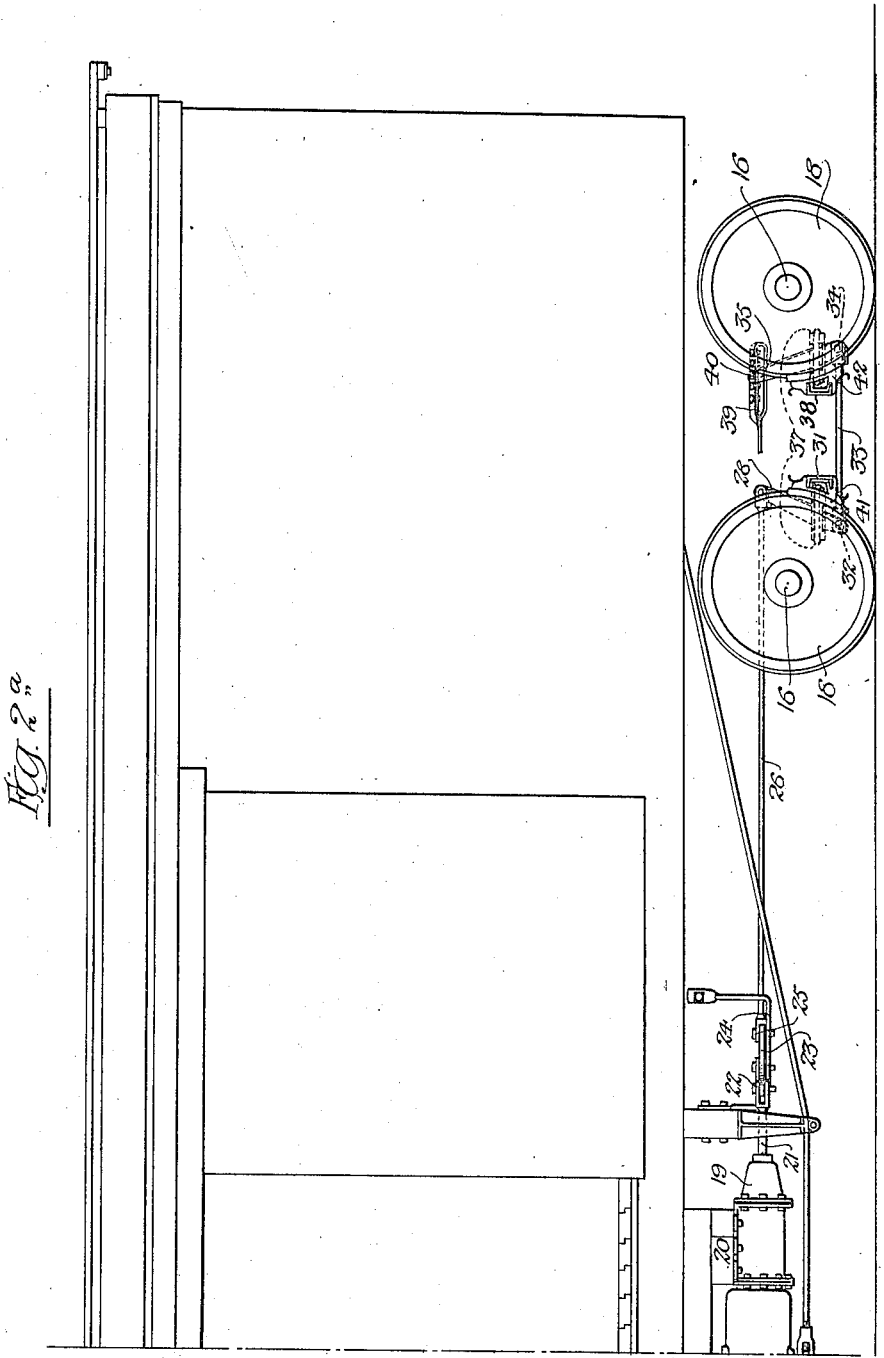

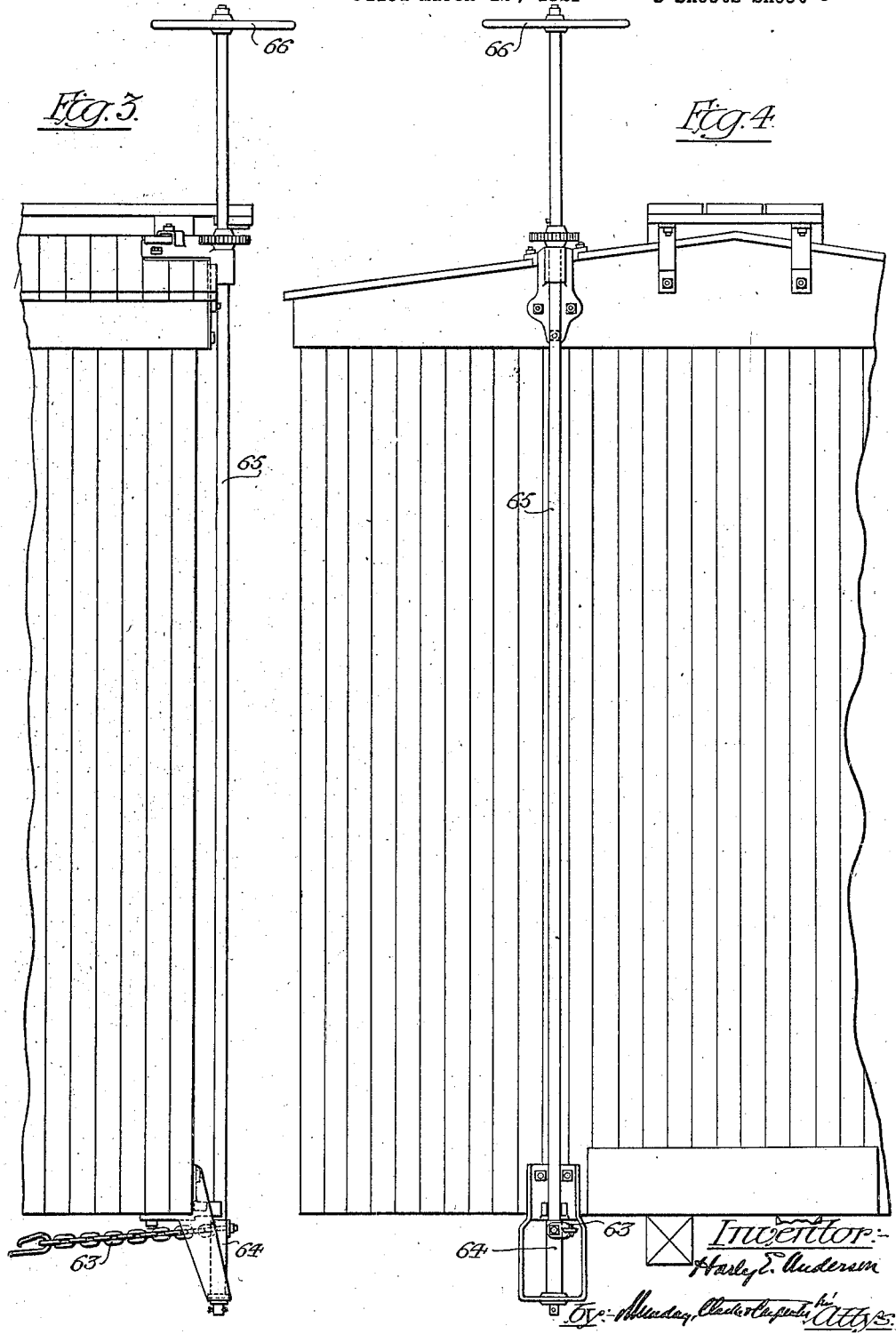

Sept. 11, 1923.
H. E. ANDERSON
1,467,701
BRAKE APPARATUS FOR RAILWAY AND OTHER VEHICLES
Filed March 12, 1921   6 Sheets-Sheet 6
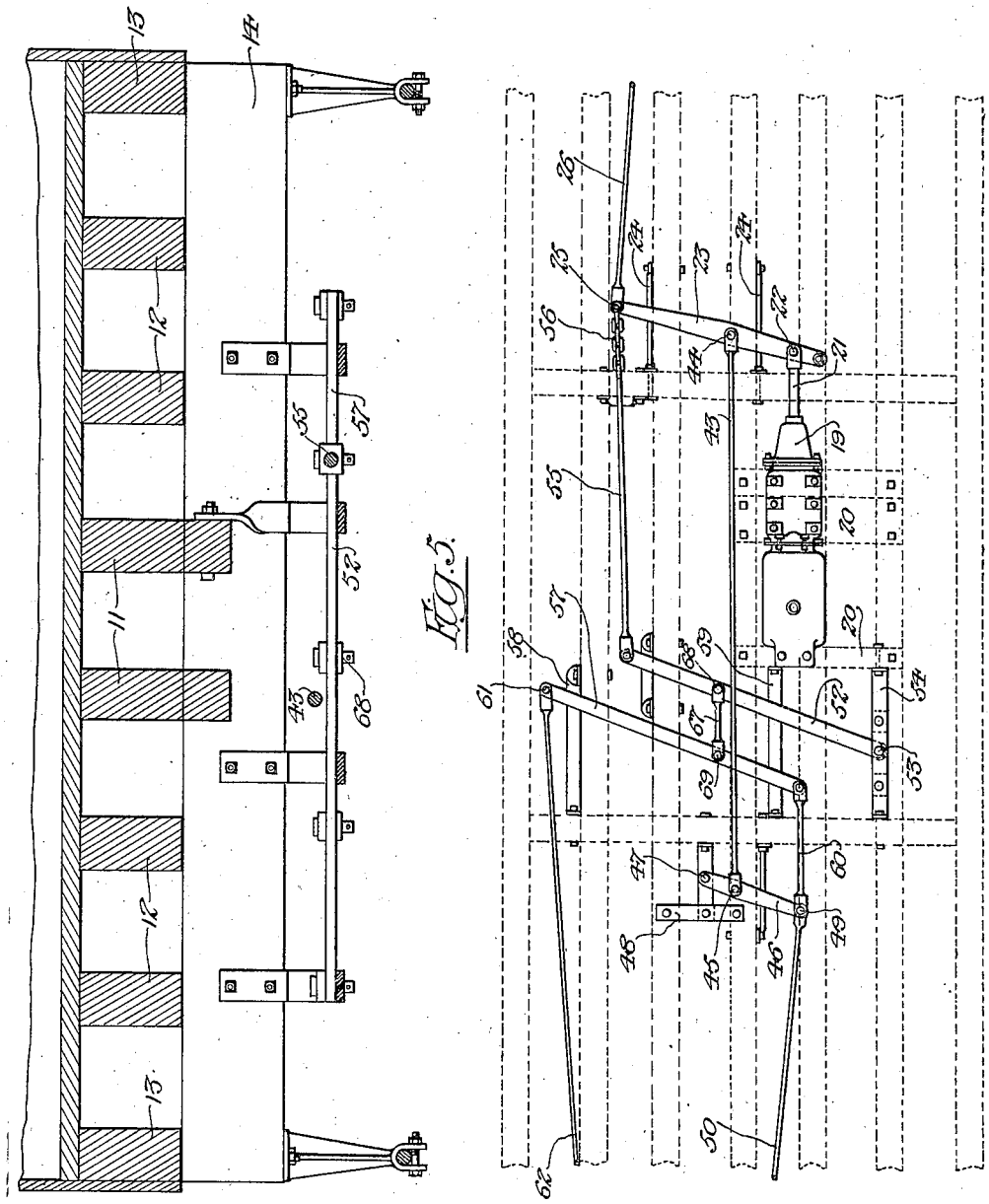

Patented Sept. 11, 1923.

1,467,701

UNITED STATES PATENT OFFICE.

HARLEY E. ANDERSON, OF CHICAGO, ILLINOIS, ASSIGNOR TO THE ANDERSON BRAKE APPLIANCE COMPANY, OF CHICAGO, ILLINOIS, A CORPORATION OF ILLINOIS.

BRAKE APPARATUS FOR RAILWAY AND OTHER VEHICLES.

Application filed March 12, 1921. Serial No. 451,918.

*To all whom it may concern:*

Be it known that I, HARLEY E. ANDERSON, a citizen of the United States, residing in Chicago, in the county of Cook and State of Illinois, have invented a new and useful Improvement in Brake Apparatus for Railway and Other Vehicles, of which the following is a specification.

This invention relates to brake apparatus, that is especially adapted for railway vehicles, and has for objects to provide a hand operated railway brake apparatus which operates in harmony with the air brake equipment, and which, under normal and even sub-normal operating conditions, will develop a braking power not less and even greater than that developed by the air brake equipment, with the result that railway and other vehicles equipped with brake apparatus constructed in accordance with the invention are provided with reserve braking power amply sufficient in extreme emergencies and entirely adequate in case of a total failure of the air brakes. The improved apparatus of the invention is further characterized by simplicity and economy of construction and by the fact that it may be applied to railway vehicles having standard air brake equipment, without substantial change in the construction or arrangement of the air brake equipment.

In addition to the general objects recited above, the invention has for further objects such other improvements or advantages in construction and operation as are found to obtain in the structures and devices hereinafter described or claimed.

In the accompanying drawings, forming a part of this specification and showing, for purposes of exemplification, a preferred form and manner in which the invention may be embodied and practiced, but without limiting the claimed invention specifically to such illustrative instance or instances:

Figures 1 and 1ª collectively represent a plan view of a railway box car equipped with a railway brake apparatus constructed in accordance with the present invention;

Figs. 2 and 2ª collectively represent a side elevation of the same;

Fig. 3 is an enlarged fragmentary side elevation of the end of the car, showing the brake staff and connected parts;

Fig. 4 is an enlarged end elevation of the car;

Fig. 5 is an enlarged plan view showing the main operating parts of the improved railway brake apparatus and their connections with the air brake equipment; and Fig. 6 is an enlarged vertical sectional elevation taken on the line 6—6 of Fig. 1.

The same characters of reference designate the same parts in each of the several views of the drawings.

In its present embodiment, the invention is applied to a railway box car, in conjunction with one standard form of air brake equipment and with other parts of standard type. For convenience, the present description will be confined to the present illustrated embodiment of the invention; the invention, however, is obviously capable of other valuable applications; hence the scope of the invention is not confined to the specific use and specific embodiment herein described as an illustrative example.

The accompanying drawings illustrate views of a standard type of railway box car, the under frame of which is constituted of the usual center sills 11, the intermediate sills 12, and the side sills 13, said sills being braced at intervals by the usual needle beams 14 that extend transversely of the car and are secured against the bottom faces of the sills 11, 12 and 13. The car is supported at its opposite ends upon the usual truck assemblies 15 and 16, said truck assemblies respectively, including the wheels 17 and 18.

The air brake equipment illustrated in the drawings is of a standard type, and embodies in its construction an air brake cylinder 19 secured to cross braces 20 of the car underframe. The push rod 21 of the air brake cylinder 19 is pivoted, at 22, to the cylinder lever 23, the latter being, in the present instance, a floating lever supported by guide straps 24 secured to the car underframe, as shown. At its extreme end from the pivoted point 22, the cylinder lever 23 is pivotally connected at 25 to the inner end of the top connection 26 which extends to the truck 16, where the said top connection is pivotally connected at 27 to one end of the live truck lever 28. The latter is pivoted between its ends, at 29, to a yoke 30 of the brake beam 31 of one pair of wheels 18, and is also pivoted at its end 32 opposite to the pivotal connection 27, to a connecting link 33. The other end of this connecting link 33 is pivoted at 34 to one end of the dead truck lever 35, said dead truck lever being pivoted between its ends at 36 in a yoke 37 of the brake beam 38 of the other pair of wheels. The end of the dead truck lever 35 opposite to the pivot point 34 is fulcrumed in a fulcrum plate 39, as shown at 40. The brake beams 31 and 38 respectively actuate pairs of brake shoes 41 and 42, which when braking power is applied are pressed into close frictional engagement with the pairs of wheels 18. This braking power is applied, during operation of the air brake equipment, in the following manner: when air enters the cylinder 19 the push rod 21 is pushed out of the cylinder, and such movement of the push rod 21 is accompanied by a movement of the cylinder lever 23 which pulls the top connection 26 toward the transverse center of the car, thereby pulling the live lever 28 and the brake beam 31 toward one pair of wheels and, through the link connection 33, moving the dead lever 35 and the brake beam 38 toward the other pair of wheels, to set the brakes.

Braking power is applied to the wheels 17 of the other truck 15 concurrently, and with the same outward movement of the push rod 21. For this purpose, the center connection 43 has one end pivoted at 44 to and between the ends of the cylinder lever 23, and the other end pivoted at 45 to and between the ends of a lever 46 that is fulcrumed at 47 on a bracket 48 supported by the car underframe. The free end of the lever 46 is pivoted at 49 to the inner end of the other top connection 50, and the latter extends to and is pivoted at 51 to the live lever 28 of the brake parts of the truck 15. As the rod 21 is pushed out of the cylinder 19 by the air, the cylinder lever 23 pulls on the rod 43, which in turn pulls the lever 46 and the top connection 50 to transmit braking power to the wheels 17 of the truck 15, in like manner to that concurrently applied to the wheels 18 of the truck 16. In practice the various levers and connections are proportioned so that, on application of air to the brake cylinder 19, substantially equal braking power is concurrently applied to both trucks 15 and 16 at the opposite ends of the car.

The present invention relates to the provision of an improved brake apparatus which, on operation of a hand brake, such as the ordinary brake staff, will, under normal or even subnormal operating conditions apply a braking power to the wheels of the trucks 15 and 16 not less than that developed by the application of the air brake equipment in the manner aforesaid, and which will operate in harmony with the air brake equipment, that is to say independently of the air brake equipment, so that application of braking power by the air cylinder 19 will not effect the directly-operated manual parts of the hand operated section of the brake apparatus.

The lever 52 is fulcrumed at one end, at 53, to a supporting bracket 54 carried in the car underframe. The other end of this lever is pivotally connected by means of a rod 55 and a yielding connection such as the chain 56 with the point of pivotal connection 25 between the cylinder lever 23 and the top connection 26. A floating power-augmenting lever 57 is supported by brackets 58 and 59 secured to the car underframe, and one end of said floating lever 57 is pivotally connected by means of a link 60 with a point of pivotal connection 49 between the lever 46 and the top connection 50. The opposite end of this lever 57 is pivotally connected at 61 to the inner end of the hand brake rod 62, the latter extending to one end of the car and being connected at that end with a yielding connecting member such as the chain 63. The extreme forward end of the chain 63 is, as shown in Figs. 3 and 4, connected with the winding drum 64 of the brake staff 65 which extends to the top of the car and is provided at its upper end with the usual hand brake operating wheel 66. The fulcrumed lever 52 and the floating power-augmenting lever 57 are pivotally connected together between their respective opposite ends by means of a link 67, said link having a pivotal connection 68 with the lever 52 and a pivotal connection 69 with the lever 57. In the present instance, the levers 52 and 57 are preferably made of the same length and the long arm $a$ of the lever 52 equals the long arm $a^2$ of the lever 57, so that the short arms $b$ and $b^2$ of the respective levers are also of the same length. With this construction a substantial balance is attained and the power transmitted by the respective levers 52 and 57 to the top connections 26 and 50, on operation of the brake wheel 66, is of substantially equal degree to both said top connections. The respective lengths of the balancing lever 52 and the power augmenting or multiplying lever 57 however depends on the character of the levers employed in the air brake equipment and, their relative sizes, and the character of the connections between the levers of the air brake equipment. The present embodiment of the invention is designed to cooperate with the particular arrangement of air brake equipment shown in the accompanying drawings, for the purpose of insuring equal distribution of power to the brakes at both ends of the car and it will be understood that the arrangement and character of the augmenting lever means employed in the connections between the hand brake wheel 66 and the connections leading from the air brake cylinder to the brake beams and shoes may be varied to suit the needs of other arrangements of air brake levers.

With the above described connections from the hand brake to the brake beams and shoes, said connections being constructed and arranged in accordance with the basic idea of the invention, on application of a normal braking power to the hand brake wheel 66, a greatly augmented braking power is transmitted through the levers 52 and 57 to the top connections 26 and 50, this braking power being not less than that transmitted to these connections on application of the air brake. The normal braking power of an air brake is substantially 60% of the light weight of the car. By means of a power augmenting mechanism constructed in accordance with the present invention, the braking power applied to the wheels may be readily augmented to and beyond 100% of the light weight of the car. The application of a normal braking power to the opposite sides of the hand brake wheel 66, for example, an application of 45 pounds braking power to the opposite sides of the rim of the hand brake wheel 66 will ultimately result in the application of a braking power to the car wheels which is substantially 100% of the light weight of the car. Consequently a braking power equal to 60% of the light weight of the car can be easily obtained by the application of even less than the normal braking power to the hand brake wheel. Moreover, the improved hand brake apparatus constructed in accordance with the invention operates in entire harmony with the air brake equipment, that is to say the yielding connections and the arrangement of the power augmenting levers prevent the transmission of power from the air brake cylinder to the brake staff. Consequently there is no danger of injury to a trainman who might be in the act of applying the hand brakes at the same instant that the engineer has applied the air brakes.

The invention as hereinabove set forth is embodied in a particular form of construction but may be variously embodied within the scope of the claims hereinafter made.

I claim:

1. In a railway brake apparatus, in combination with the brake beams and shoes, the operating devices therefor, and the air brake system which includes the brake cylinder and the lever mechanism positively connected with said operating devices; a hand-operated brake element; power augmenting means comprising a fixed lever and a floating lever pivotally connected together and operatively connected with said hand-operated brake element and with the aforesaid operating devices and operable to transmit through said operating devices to the brake beams and shoes a braking power augmented over that applied to the hand-operated brake element; and yielding connections interposed in the connections between the hand-operated brake element and said air brake lever mechanism for preventing transmission of power from the air brake cylinder to said hand-operated brake element; substantially as specified.

2. In a railway brake apparatus, in combination with the brake beams and shoes, the operating devices therefor, and the air brake system which includes the brake cylinder, the piston and the floating and fixedly pivoted levers positively connected with said operating devices; a hand-operated brake element; and power augmenting lever means having a positive connection with said fixedly pivoted lever and being also connected with the air brake floating lever and operable to transmit through said operating devices to the brake beams and shoes a braking power augmented over that applied to the hand-operated brake element; substantially as specified.

3. In a railway brake apparatus, in combination with the brake beams and shoes, the operating devices therefor, and the air brake system which includes the brake cylinder and piston and the lever mechanism positively connected with said operating devices; a hand-operated brake element; and power augmenting lever means including a floating lever operatively connected therewith and with the aforesaid operating devices and operable concurrently with the entire air brake system to transmit through said operating devices to the brake beams and shoes a braking power augmented over that applied to the hand-operated brake element and to partially withdraw said piston from said cylinder; substantially as specified.

4. In a railway brake apparatus, the combination with the brake shoes, and the air brake system including the piston element and the lever devices positively connected with the brake shoes, of a hand-operated brake element, and power augmenting connections including a floating lever interposed between said air brake system and the hand-operated brake element, said power augmenting connections having a positive power transmitting connection with the air brake lever devices to move the piston when the hand brake element is operated and being operable to apply to the brake shoes braking power augmented over that applied to the hand-opperated brake element; substantially as specified.

5. In a railway brake apparatus, the combination with the brake shoes, and the air brake system positively connected therewith, of a hand-operated brake element, and a compound power augmenting lever mechanism interposed between said air brake system and the hand-operated brake element, said power augmenting lever mechanism having a positive power transmitting connection with the air brake system whereby the entire air brake system moves with said power augmenting connections, the power augmenting connections being operable to apply to the brake shoes braking power augmented over that applied to the hand-operated brake element; substantially as specified.

6. In a railway brake apparatus, in combination: the brake shoes; the air brake lever and piston system positively connected therewith; a hand-operated brake element; compound power augmenting devices having pivotal operating connections from said hand-operated brake element and through the air brake lever system, for operating the air brake lever and piston system concurrently with the hand-operated brake element when the latter is operated; and means for preventing transmission of power from said air brake system to said hand-operated brake element; substantially as specified.

7. In a railway brake apparatus, in combination: the air brake cylinder; the brake beams and shoes; the air brake levers; the positive connections between said air brake levers and the brake beams and shoes; power augmenting lever means including a fixed lever and a floating lever having a positive operating connection with said air brake levers; a hand-operated brake element; and power transmitting connections between said hand-operated brake element and said power augmenting lever means; substantially as specified.

8. In a railway brake apparatus which includes the air brake lever system, the brake cylinder and piston, in combination: the truck brake levers at the opposite ends of the car and connected by positive power transmitting devices with the air brake cylinder, a hand-operated brake element; and compound power augmenting means connecting said truck brake levers with said hand-operated brake element through a positive power connection with the air brake system, for transmitting directly to said truck brake levers an augmented braking power and for withdrawing said piston from said cylinder concurrently with the operation of the air brake levers; substantially as specified.

In testimony whereof I have hereunto set my hand.

HARLEY E. ANDERSON.